United States Patent [19]

Kreitmeier

[11] Patent Number: 4,648,791

[45] Date of Patent: Mar. 10, 1987

[54] ROTOR, CONSISTING ESSENTIALLY OF A DISC REQUIRING COOLING AND OF A DRUM

[75] Inventor: Franz Kreitmeier, Baden, Switzerland

[73] Assignee: BBC Brown, Boveri & Company, Limited, Baden, Switzerland

[21] Appl. No.: 738,788

[22] Filed: May 29, 1985

[30] Foreign Application Priority Data

Jun. 30, 1984 [DE] Fed. Rep. of Germany ....... 3424139

[51] Int. Cl.$^4$ .............................................. F01D 5/08
[52] U.S. Cl. .................... 415/116; 415/115; 415/180; 416/95
[58] Field of Search ............... 415/115, 116, 117, 175, 415/176, 178, 180, 208; 416/95

[56] References Cited

U.S. PATENT DOCUMENTS

| | | | |
|---|---|---|---|
| 981,175 | 1/1911 | Corthesy | 415/116 |
| 2,584,899 | 2/1952 | McLeod | 415/115 |
| 3,231,313 | 1/1966 | Fermer | 415/116 |
| 3,582,230 | 6/1971 | Schmidt | 415/117 |
| 3,602,605 | 8/1971 | Lee | 415/116 |
| 3,820,570 | 6/1974 | Holzhuter | 415/208 |
| 4,008,977 | 2/1977 | Brown et al. | 415/116 |
| 4,435,123 | 3/1984 | Levine | 415/115 |
| 4,447,190 | 5/1984 | Campbell | 415/116 |

FOREIGN PATENT DOCUMENTS 15907 2/1977 Japan .................................. 415/117

Primary Examiner—Everette A. Powell, Jr.
Attorney, Agent, or Firm—Burns, Doane, Swecker & Mathis

[57] ABSTRACT

A rotor including a disc requiring cooling, a drum, a cover surrounding the drum so as to provide an annular space, a radial cooling air supply line, and a deflection cascade in the supply line, which cascade deflects the cooling medium in the rotational direction of the rotor and accelerates the cooling medium to the peripheral velocity of the disc.

10 Claims, 2 Drawing Figures

ROTOR, CONSISTING ESSENTIALLY OF A DISC REQUIRING COOLING AND OF A DRUM

FIELD OF THE INVENTION

The present invention relates to turbine rotors and more particularly to turbine rotors having a disc, a drum and an arrangement for supplying cooling air to the disc of the rotor.

BACKGROUND OF THE INVENTION

Turbine rotors with cooling arrangements are often found in turbo-machine construction, particularly in gas turbines. The disc requiring cooling generally comprises a shaft fitted with rotor blades and heat barrier segments. The cooling medium, generally air, is led along an annular space between a drum and a drum cover to the end face of the shaft and introduced into cooling openings in the end face. A radial supply line is provided for introducing air into the annular space between the drum and its cover. The cooling air entering, therefore, impinges radially on the drum and is distributed in the annular space between the drum and the cover. The drum is provided with a barrier labyrinth on the side remote from the shaft requiring cooling. In a known arrangement, there is a throttle labyrinth between the radial air inlet and the disc containing the cooling openings. The labyrinth reduces the pressure existing in the annular space to the value required by the consumers. This labyrinth is absolutely necessary in order to distribute the air, which is supplied at one point only, evenly over the annular space.

A disadvantage of this arrangement is that the throttle labyrinth clearance necessary is very difficult to calculate. In addition, the sealing strips making up the labyrinth are subjected to large aerodynamic loads. These conditions make it difficult to provide the correct amount of cooling air to the shaft. Finally, the flow losses occurring in the labyrinth are significant. Another unfavourable feature is that losses occur due to the braking effect of the air when it enters the rotating cooling openings. The excessively high mass flow through the barrier labyrinth is also a disadvantage. This high rate of leakage flow, which constitutes a loss, arises because the air must be introduced at a high effective cooling air pressure at the entry to the throttling labyrinth.

OBJECTS AND SUMMARY OF THE INVENTION

An object of the present invention is to ensure a reliable supply of cooling air to the disc of a rotor of the type previously described under all operating conditions.

Another object of the present invention is to provide correct metering of the quantity of cooling media for each particular condition with practically constant cross-sections.

These and other objects are achieved by the present invention which provides a rotor assembly having a disc requiring cooling, a drum, a cover surrounding the drum so as to delimit an annular space, a radial cooling air supply line and a deflection cascade in the supply line, which cascade deflects the cooling medium in the rotational direction of the rotor and accelerates the cooling medium to the peripheral velocity of the disc.

In the present invention, the cooling medium is not only introduced into the annular space in the rotational direction of the rotor but is, in addition, accelerated in a deflection cascade to approximately the peripheral speed of the disc, whereby the braking losses in the disc region are rendered negligibly small.

BRIEF DESCRIPTION OF THE DRAWING

Further features and advantages of the invention are given in the following description of a preferred embodiment, in association with the attached drawing, in which the invention is diagrammatically presented, using a gas turbine. In this drawing, elements which are unimportant to the invention and do not contribute to a understanding are omitted. In the drawing.

DETAILED DESCRIPTION OF THE PREFERRED EMBODIMENT

Figure 1:
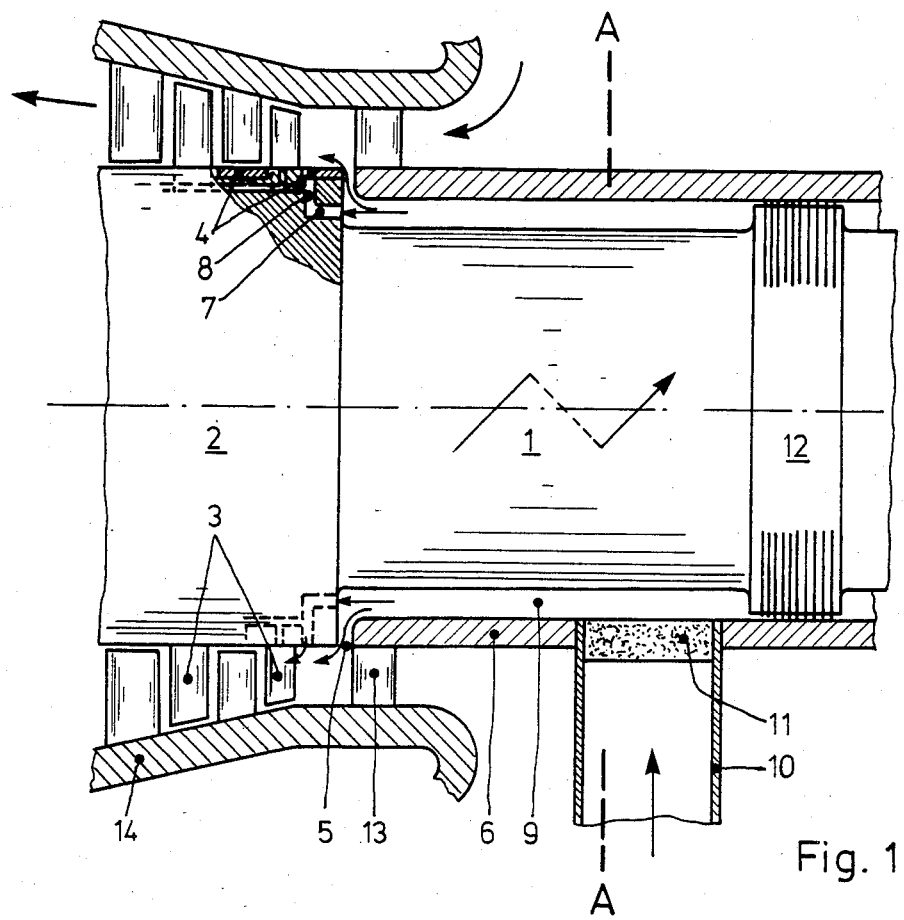
FIG. 1 is a partial longitudinal section through rotor in accordance with a preferred embodiment of the present invention.
Figure 2:
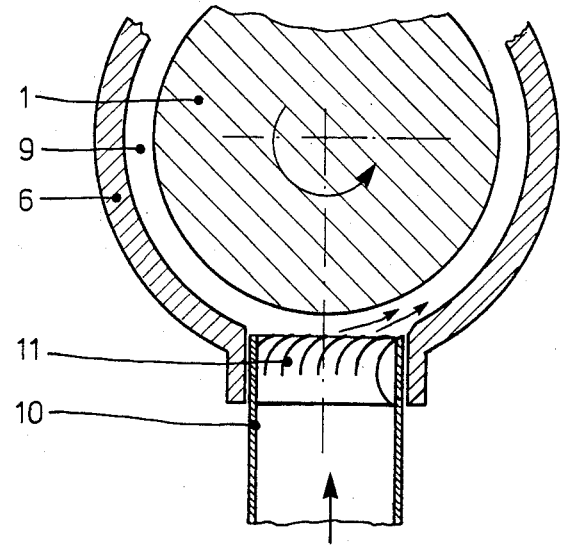
FIG. 2 is a cross-section along the line A—A in FIG. 1.

The rotor according to a preferred embodiment of the present invention comprises a drum 1 and a disc 2, which is referred to below as the blade shaft. Several rows of rotor blades 3 are attached to this shaft. The attachment is undertaken in known manner by means of blade feet in grooves, neither of which are shown. In order to protect the shaft surface from contact with the extremely hot working gases, heat barrier segments 4 are located around the shaft periphery between the rows of rotor blades—at least in the case of the front stages. It is, in particular, these blade feet and the heat barrier segments which are to be considered as parts belonging to the disc and which have to be cooled.

In the preferred embodiment, the cooling medium, air in this case, is supplied to the shaft by two routes. In the first place, it is supplied through an annular gap 5 which is located between the end face of the shaft and a cover 6 adjacent to it. In the second case, it is supplied through openings in the end face of the shaft. These are axially directed holes 7 which communicate with the shaft surface via radial connections 8. The shaft surface is considered to be that cylindrical plane in which the cooling medium flows through and around the parts to be cooled. It is obvious that it is not necessarily strictly to maintain the axial and radial directions of the corresponding openings 7 and 8, respectively; under certain circumstances, design and/or flow technology requirements may make another direction seem more desirable.

The drum 1, which forms the actual shaft stub, is surrounded by the cover 6, previously mentioned. The two elements therefore enclose an annular space 9. At the end remote from the blade shaft, this annular space is sealed by a barrier labyrinth 12. At the blade shaft end, the cover forms the seal and, in some cases, the retention for the shrouds of the first row of turbine guide vanes 13, whose feet are located in the vane carrier 14.

It may be seen from this configuration that the air from the first route cools the surface of the blade shaft between the first guide vane row and the first rotor blade row and then emerges into the duct through which the working gas flows. It is obvious that the cooling air from the second route can impinge on the blade feet of all the rotor blade rows and the rest of the shaft surface.

The pressure existing in the flow duct before the first rotor blade row therefore decides the pressure necessary for the cooling medium in the annular space 9 and, in consequence, in the supply line 10. This supply line 10 is a round pipe entering radially into the annular space 9; it is connected to the cover 6 in a suitable manner. At the point where it emerges, the supply line 10 is provided with a deflector cascade 11 whose vanes are directed, at the outlet end, in the rotational direction of the rotor. It is obvious that provision of the exact geometrical data will be omitted here because it is not sufficiently signicant, depending, as it does, on an excessively large number of parameters.

It should, however, be mentioned that the cascade is preferably an accelerator cascade which is so designed that, at rotor normal speed, the air from the deflector cascade emerges with approximately the peripheral speed of the disc. The vortex flow rotating in the annular space 9 ensures stable flow conditions; this has the consequence that the air impinges cleanly on the axial holes 7 over the whole of their cross-section. In addition, the leakage air flowing from the annular gap 5—after it has cooled the end face—has a flow vector which is such that the flow conditions existing at outlet from the first guide vanes are not adversely affected.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes and variations which come within the meaning and range of the claims are therefore intended to be embraced therein.

What is claimed is:

1. In a rotor assembly of the type including a rotatable disc requiring cooling, a rotatable drum, a cover surrounding the drum so as to provide an annular space between the cover and the drum, and a radial supply line for introducing cooling medium into the annular space from a circumferentially fixed location on said rotor assembly, said drum rotatable relative to said radial supply line, wherein the improvement comprises a deflector cascade provided in the radial supply line, said deflector cascade having an outlet end and vanes directed at the outlet end in a rotational direction of the drum, whereby the cooling medium is deflected in the rotational direction of the drum when introduced into the annular space.

2. The rotor assembly according to claim 1, wherein the deflector cascade is adapted to accelerate the cooling medium to a peripheral velocity of the disc.

3. The rotor assembly according to claim 1, wherein openings for receiving the cooling medium on the disc are located on an end surface of the disc facing toward the drum.

4. The rotor assembly according to claim 3, wherein the openings are axially directed.

5. The rotor assembly according to claim 4, wherein the openings communicate with the surface of the disc via radial connecting passages.

6. The rotor assembly according to claim 1, wherein an annular gap is provided between the disc and the cover, through which gap cooling medium emerges from the annular space.

7. The rotor assembly according to claim 5, wherein the disc is a bladed gas turbine shaft and said rotor assembly includes a first guide van row, the radial connecting passages located downstream of the first guide vane row.

8. The rotor assembly according to claim 6, wherein the disc is a bladed gas turbine shaft and said rotor assembly includes a first guide vane row, the annular gap located downstream of the first guide vane row.

9. The rotor assembly according to claim 7, wherein an annular gap is provided between the disc and the cover, through which gap cooling medium emerges from the annular space, said annular gap located downstream of the first guide vane row.

10. The rotor assembly according to claim 1, wherein said drum is rotatable relative to said cover, said radial supply line including a tubular, radially directed end portion in said cover, said deflector cascade vanes being parallel to one another and spanning said end portion in a direction parallel to an axis of rotation of said drum.

* * * * *